(12) United States Patent
Maeda et al.

(10) Patent No.: US 6,295,352 B1
(45) Date of Patent: Sep. 25, 2001

(54) SWITCHING SYSTEM FOR AUTOMATIC CALL DISTRIBUTION AND NEW OPERATION TRAINING

(75) Inventors: Yuji Maeda; Koji Yamato, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/128,629

(22) Filed: Aug. 4, 1998

(30) Foreign Application Priority Data

Feb. 24, 1998 (JP) .................................................. 10-042553

(51) Int. Cl.⁷ ...................................................... H04M 3/00
(52) U.S. Cl. ............................ 379/265; 379/266; 379/202
(58) Field of Search ..................................... 379/265, 266, 379/309, 202–205, 210, 211, 221; 370/270

(56) References Cited

U.S. PATENT DOCUMENTS

| | | | | |
|---|---|---|---|---|
| 5,155,763 | * | 10/1992 | Bigus et al. | 379/113 |
| 5,396,542 | * | 3/1995 | Alger et al. | 379/210 |
| 5,721,770 | * | 2/1998 | Kohler | 379/266 |
| 6,047,060 | * | 4/2000 | Fedorov et al. | 379/265 |
| 6,128,380 | * | 10/2000 | Shaffer et al. | 379/265 |

FOREIGN PATENT DOCUMENTS

| | | |
|---|---|---|
| 1-174184 | 7/1989 | (JP) . |
| 6-105356 | 4/1994 | (JP) . |

* cited by examiner

*Primary Examiner*—Creighton Smith
*Assistant Examiner*—Benny Q. Tieu
(74) *Attorney, Agent, or Firm*—Helfgott & Karas, P.C.

(57) ABSTRACT

The present invention provides a switching system capable of providing an ACD service while educating operator. The control part in the switching system, when being requested to establish an ACD call, selects a responsible main-operator terminal among plural responsible main-operator terminals and controls the switching part and the MXT in a manner that the selected main-operator terminal receives the ACD call, and selects a responsible sub-operator terminal among plural responsible sub-operator terminals and controls the switching part and the MXT in a manner that information transmitted with the established call can be listened by using the selected sub-operator terminal.

10 Claims, 4 Drawing Sheets

FIG. 2

| CALLING METHOD | SELECTING METHOD | OPERATOR TERMINAL | CLASSIFI-CATION | REGISTERED SUB-OPERATOR TERMINAL | PRIORITY | SELECTION PROPRIETY |
|---|---|---|---|---|---|---|
| AUTOMATIC / MANUAL | EQUALED DISTRIBUTION / PRIORITY / REGISTERED OPERATOR | A | FIRST | (E) | — | SELECTION POSSIBLE |
| | | B | FIRST | (E) | — | SELECTION POSSIBLE |
| | | C | FIRST | (F) | — | SELECTION POSSIBLE |
| | | D | FIRST | (F) | — | SELECTION POSSIBLE |
| | | E | SECOND | — | (1) | SELECTION POSSIBLE |
| | | F | SECOND | — | (2) | SELECTION POSSIBLE |

SWITCHING SYSTEM FOR AUTOMATIC CALL DISTRIBUTION AND NEW OPERATION TRAINING

BACKGROUND OF THE INVENTION

1. Field of the Invention

The present invention relates to a switching system, particularly, a switching system having a so-called automatic call distribution function.

2. Description of the Related Art

There is a switching system having an ACD function (Automatic Call Distribution) among existing switching systems. According this ACD function, a call requested by one telephone number is received by an operator terminal capable of responding the call among plural operator terminals connected to the switching system. This ACD function is used for ticket sale and the like.

In order to provide a service of high quality by using the ACD function, there must be operators who can deal with requests and questions from service users correctly and promptly. In other words, in order to provide a service of high quality by using the ACD function, it is necessary to give training to (educate) operators so as to be skilled.

In order to bring up skilled operators, operators must have experience of dealing with users actually. However, a quality of service has deteriorate when an unskilled operator deals with users. In other words, it is not desirable to bring up operators by dealing with users actually.

SUMMARY OF THE INVENTION

Therefore, the present invention has an object to provide a switching system capable of providing a service using an ACD function while training operators.

To solve the above-described problems, a switching system of the present invention comprises (i) a switching unit, connected to plural main-operator terminals and to plural sub-operator terminals, for connecting a terminal in a public network and a main-operator terminal among the plural main-operator terminals and for making a condition in that information transmitted between two connected terminals including the terminal and the main-operator terminal can be listened with a sub-operator terminal among the plural sub-operator terminals, (ii) a main-operator terminal selection unit, when a call of a predetermined type is received by the switching unit, for selecting a responsible main-operator terminal among the plural main-operator terminals, (iii) a first control unit for controlling the switching unit in a manner that the main-operator terminal selected by the main-operator terminal selection unit receives the call, (iv) a sub-operator terminal selection unit, when the main-operator terminal receives the call with first control unit, for selecting a responsible sub-operator terminal among the plural operator terminals, and (v) a second control unit for controlling the switching unit in order to make a condition in that information transmitted through the call received by the main-operator terminal can be listened with the sub-operator terminal selected by the second terminal selection unit.

According to this switching system of the present invention, the operator of the sub-operator terminal can listen to the call between the operator of the main-operator terminal and a user (namely, an calling subscriber of an ACD), therefore, it is possible to educate operators speedily.

When the switching system of the present invention is carried out, the main-operator terminal selection unit means may select the main-operator terminal in order to carry out equaled distribution of calls for the plural main-operator terminals (in order to equalize a number of calls received by each main-operator terminal).

The sub-operator terminal selection unit may select the sub-operator terminal in order to equalize a number of selection for each sub-operator terminal.

The switching system may further comprise a correspondence terminal information keeping unit for keeping correspondence terminal information corresponding the plural main-operator terminals with the plural sub-operator terminals, respectively, and the sub-operator terminal selection unit may select a sub-operator terminal corresponded to the main-operator receiving the call based on the correspondence terminal information.

According the switching system of the present invention, operators to be educated (operators of the sub-operator terminals) can learn how to deal with subscribers after the example of a main-operator or more main-operators (operators of the main-operator terminals)

The switching system may further comprise a rewriting unit for rewriting said correspondence terminal information kept in the correspondence terminal information keeping unit in order to correspond a main-operator terminal to a sub-operator terminal specified in accordance with information specifying the sub-operator terminal, the information inputted from the main-operator terminal.

The switching system may further comprise a priority information keeping unit for keeping priority information determining orders of the plural sub-operator terminals, and the sub-operator terminal selection unit may select a sub-operator terminal to which a highest order of priority is given in accordance with the priority information kept in the priority information keeping unit, among responsible sub-operator terminals.

According to this switching system of the present invention, an operator of higher order of priority can listen the call between an main-operator and a user (a subscriber) with higher frequency.

The sub-operator terminal selection unit, when the first control unit detects that a predetermined operation is executed for the main-operator terminal receiving the call, selects a sub-operator terminal of a high order of priority.

In other words, a switching system may be structured, in which only when a main-operator is executed for the main-operator terminal, a sub-operator can listen a call between the main operator and a subscriber.

The sub-operator terminal selection unit, when detecting that a sub-operator terminal is specified for the main-operator terminal receiving the call, may select the specified sub-operator terminal.

The switching unit may also make a condition in that the call is connected among three parties including the terminal in the public network and the main-operator terminal between which the call is established, and the sub-operator terminal among the plural sub-operator terminals, and the second control unit may control the switching unit in order to make a condition in that the call is connected among three parties including the sub-operator terminal selected by the sub-operator terminal selection means, and the terminal in the public network and the main-operator terminal between which the call is established.

BRIEF DESCRIPTION OF THE DRAWINGS

Other objects and advantages of the present invention will become apparent during the following discussion conjunction with the accompanying drawings, in which:

FIG. 2 is an explanatory view showing ACD operator group information kept in a control part of the switching system according to the embodiment;

DETAILED DESCRIPTION OF THE PREFERRED EMBODIMENT

Hereinafter, concrete explanations will be given of an embodiment according to the present invention with reference to drawings.

First, an explanation will be given of a structure of a switching system 10 and of an outline of an operation for an ACD call with reference to FIG. 1.

Figure 1:
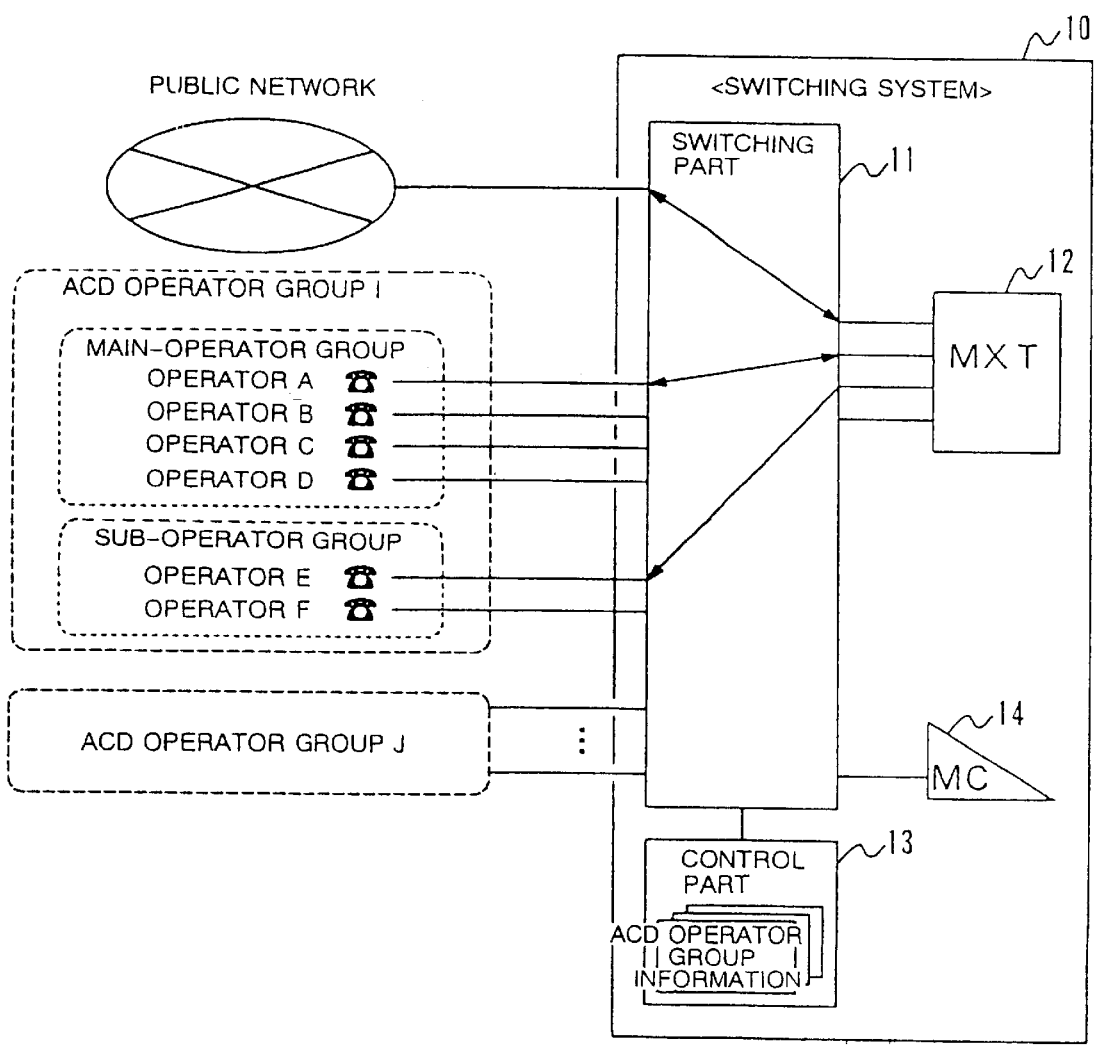
FIG. 1 is an explanatory view showing a structure and an action of a switching system according to an embodiment of the present invention.

As shown in FIG. 1, the switching system 10 is provided with a switching part 11 connected to plural operator terminals (telephones with function buttons) and connected to a public network and a mixer trunk (MXT) 12 that is a circuit multi-connecting the ACD call from public network to two operator terminals in accordance with the switching part 11.

The switching system 10 is also provided with a control part 13 containing a CPU and peripheral units and used as a control circuit for the switching part 11 and the MXT 12, and a maintenance console 14 used to set various information in the control part 13.

In order to utilize the ACD function of the switching system 10 according to the embodiment, it is necessary to register the ACD operator group information in the control part 13 by using the maintenance console 14.

The ACD operator group information, as shown in FIG. 1, includes information used to classify the plural operator terminals connected to the switching part 11 into ACD operator groups, each of the ACD operator groups containing main-operator and sub-operator groups. The main-operator group includes operator terminals used by main-operators who actually talk with a calling subscriber of an ACD call (hereinafter, called first operator terminals). The sub-operator group includes operator terminals used by sub-operators who receive training (hereinafter, called second operator terminals).

The control part 13 controls the switching part 11 and the MXT 12. With these controls, when an ACD call is received by the switching part 11, the ACD operator group information of the ACD call is referred, whereby information transmitted between a calling terminal of the ACD call and one main-operator terminal is also sent to sub-operator terminals while the calling terminal and the first terminal are connected. In other words, the control part 13 makes a condition in that, when the ACD call is received by the switching part 11, the main-operator can talk with the calling subscriber and can also listen their conversation.

Hereinafter, concrete explanations will be given of the switching system 10.

First, with reference to FIG. 2, a structure of the ACD operator group information is explained. As shown in FIG. 2, the ACD operator group information includes calling method information, selecting method information, plural pieces of operator terminal information, classification information corresponded to the operator terminal information, registered sub-operator terminal information, priority information and selection propriety information.

These information expect for the selection propriety information can be set or updated from the maintenance console 14, and the selection propriety information is set by the control part 13.

In setting (updating) information from the maintenance console 14, as the calling method information, information showing that the sub-operator is called automatically (automatic) or information showing that the sub-operator terminal is called when instructed by the main-operator (manual) is set. As the selecting method information, information specifying a selecting method for the second terminal among an equaled distribution selecting method, a priority selecting method and a registered operator selecting method.

Identification information of each operator terminal belonging to the ACD operator group is also set as operator terminal information. As identification information corresponding to each operator terminal information, information is set, the information showing whether the operator terminal identified by the operator terminal information is a main-operator terminal or a sub-operator terminal.

According to the registered operator selecting method, identification information of one sub-operator terminal in the sub-operator group is set as registered operator identification information for each first operator terminal. According to the propriety order selecting method, priority information for each sub-operator terminal (numerical information) is set.

Next, concrete explanations will be given of a control of the control section 13 concerning the ACD function.

The control by the control part 13 concerning the ACD function is roughly divided into a control for a log-in/log-off operation executed by the operator terminal and a control when an ACD call is received by the switching part 11.

First, the former control is explained.

The control part 13, when detecting that a log-in operation (executed by that an operator inputs a log-in special code) for one operator terminal, changes the selection propriety information in the ACD operator group information concerning the operator terminal for "selection possible". At this case, when the operator terminal is a main-operator terminal, a process is also executed in that the operator terminal information of the main-operator terminal is add to the end of a main queue (a detailed explanation will be given later). When the operator terminal used for the log-in operation is a sub-operator terminal and when the equaled distribution selecting method is used as the selecting method, a process is also executed in that the operator terminal information of the sub-operator terminal is added to the end of a sub-queue (a detailed explanation will be given later).

On the other hand, the control part 13, when detecting that a log-off operation (executed by that an operator inputs a log-off special code) for one operator terminal, changes the selection propriety information in the ACD operator group information concerning the operator terminal for "selection impossible". At this case, when the operator terminal is a main-operator terminal, a process is also executed in that the operator terminal information of the main-operator terminal is removed from the main queue. When the operator terminal used for the log-off operation is a sub-operator terminal and when the equaled distribution selecting method is used as the selecting method, a process is also executed in that the operator terminal information of the sub-operator terminal is removed from the sub-queue.

In other words, the control part 13, when the equaled distribution selecting method is used for one ACD operator group information, operates while keeping the maine queue and the sub-queue concerning the ACD operator group information, and when the priority selecting method or the registered operator selecting method is used, operates while keeping only the maine queue.

Next, an explanation will be given of the control operation of the control part 13 when an ACD call is received by the switching part 11 with reference to FIGS. 3 and 4.

Figure 3:
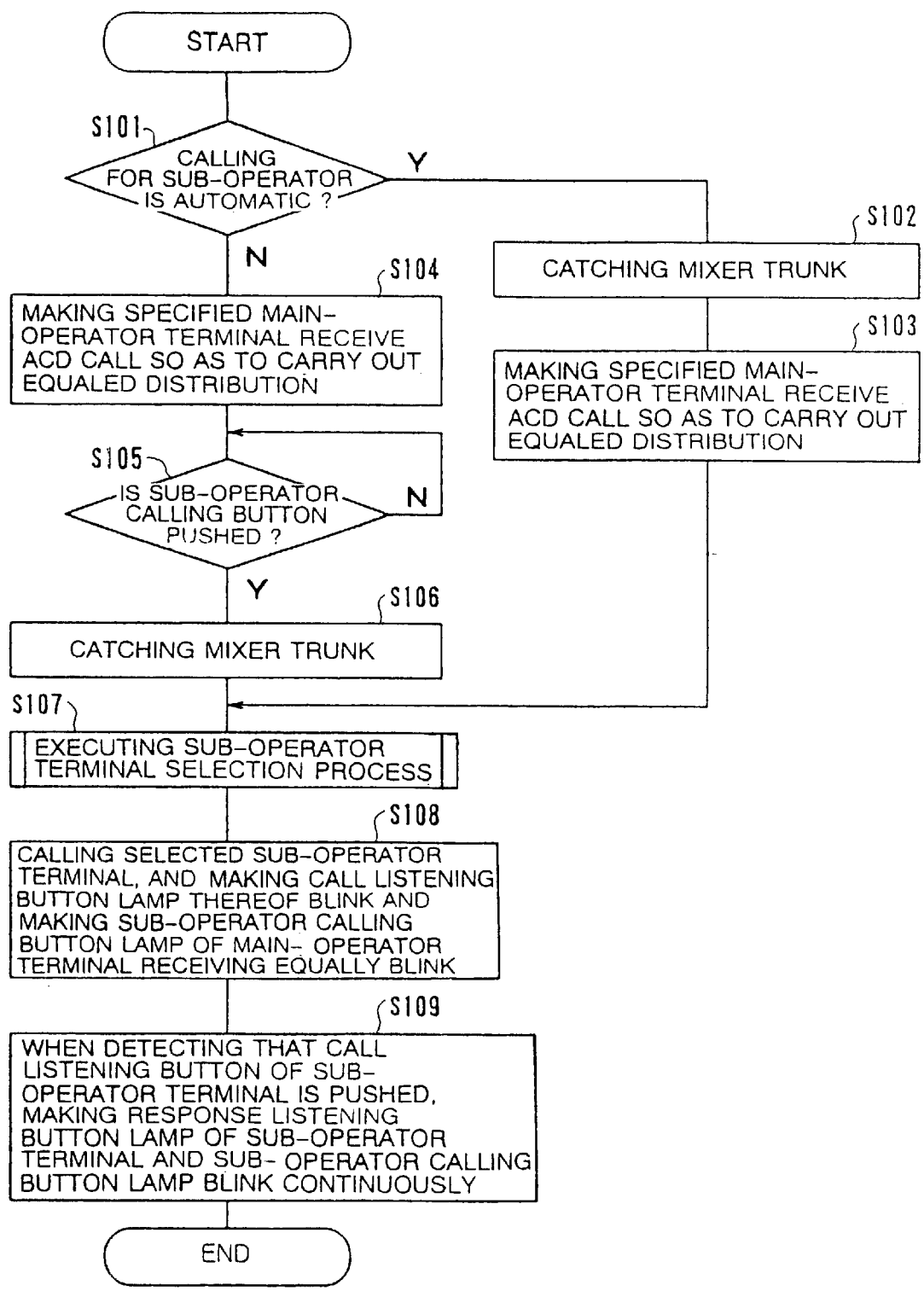
FIG. 3 is a flowchart showing an action of the control at receiving an ACD call according to the embodiment.

FIG. 3 is a flowchart showing an outline of the action of the control part 3 from receiving the ACD call by the switching part 11 till making the switching system in a condition that a call can be established between the calling terminal and the main-operator terminal and the call can be listened by the sub-operator terminal. FIG. 4 is a flowchart showing the action of the control part 13 during the sub-operator terminal selecting process executed in the flow shown in FIG. 3.

As shown in FIG. 3, the control part 13, when detecting that an ACD call is received by the switching part 11, determines whether the calling method information in the ACD operator group information concerning the ACD call shows "automatic" or not (Step S101). When the calling method information shows "automatic" (Step 101; Y), the control part 13, catches the MXT 12 in order to execute multi-connection (step S102). Subsequently, the control part 3 controls the switching part 11 and the MXT 12 in a manner that the ACD call is received by the responsible main-operator terminal specified so as to carry out the equaled distribution of the ACD calls (Step S103). Concretely, in this step S103, the control part 13 makes the main-operator terminal receive the ACD call, the main-operator terminal identified by the operator terminal information in the top of the main queue. Then, the control part 13 removes the operator terminal information for receiving the ACD call from main queue. In other words, the control part 13 updates 3 the main queue to leave only operator terminal information concerning responsible main-operator terminals remain.

Thereafter, the control part 13 starts the sub-operator terminal selecting process for selecting the sub-operator terminal to be multi-connected (Step S107).

Figure 4:
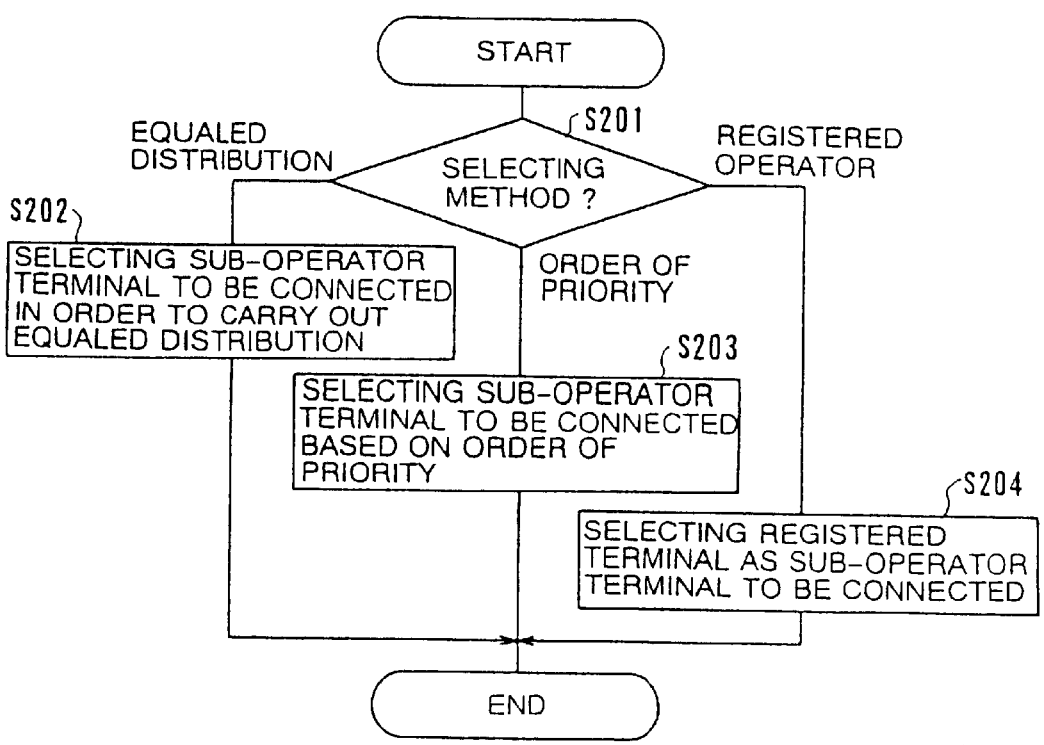
FIG. 4 is a flowchart showing a process specifying a sub-operator terminal executed by the control part in the switching system according to the embodiment.

In the sub-operator terminal selecting process, the control part 13, as shown in FIG. 4, first, recognizes the selecting method information in the ACD operator group information (step S201).

Then, the control part 13, when the selecting method information shows that the equaled distribution selecting method is used (Step S201; equivalent distribution), selects a sub-operator to be connected so as to carry out the equaled distribution (Step S202), and terminates the sub-operator terminal selecting process. In other words, in this case, since the sub-queue is formed, the control part 13 selects the sub-operator terminal identified by the operator terminal information in the top of sub-queue as a sub-operator to be connected.

When the sub-operator selecting method information shows that the sub-operator is selected according to the order of priority (step S201; priority), the control section 13 selects a sub-operator terminal to be connected based on the priority information in the ACD operator group information (Step S203), and terminates the sub-operator terminal selecting process. In other words, the control part 13 specifies a sub-operator terminal of the highest order of priority (the value of the priority information is lowest) among sub-operator terminals of which the selection propriety is "selection possible" and which are not used, and selects the sub-operator terminal as the sub-operator terminal to be connected.

When the sub-operator selecting method information shows that the registered operator is selected (Step S201; registered operator), the control part 13 selects, as the sub-operator terminal, the sub-operator terminal identified by the registered operator terminal information corresponded to the main-operator receiving the ACD call (Step S204), and terminates the sub-operator terminal selecting process.

Returning to FIG. 3, explanations will be given of the action of the control part 13 after the sub-operator terminal selecting process.

After the sub-operator terminal selecting process (step S107), the control part 13 calls the selected sub-operator terminal, and controls to make a call listening button lamp of this sub-operator terminal blink and to make a sub-operator calling button lamp of the main-operator terminal performing the equaled distribution receiving blink (Step S108). The response listening button lamp is attached to a function button used as a call listening button of the sub-operator terminal, and the sub-operator calling button lamp is attached to a function button used as the sub-operator calling button of the main-operator terminal.

Subsequently, the control section 13, when detecting that the call listening button of the selected sub-operator terminal is pushed, controls so as to make the response listening button lamp of the sub-operator terminal continuously blink and to make the sub-operator calling button of the main-operator continuously blink (Step S109), and terminates the process shown in FIG. 3. Additionally, the flowchart does not show a process, however, the control part 13, when detecting that the call listening button of the selected sub-operator terminal is pushed, executes the process for removing information concerning this sub-operator from the sub-queue when the equaled distribution selecting method. In cases of the priority selecting method and the registered operator terminal selecting method, the control part 13 records that this sub-operator terminal is used. Then, the control part 13, when detecting that the ACD call is cut off, adds the operator terminal information of the main-operator terminal concerning this ACD call to the end of the main queue. When there is a sub-queue, the similar process is executed for the sub-queue.

Now, when the calling method information in the ACD operator group information concerning the received ACD call shows "manual" (Step S101; N), the control part 13, first, specifies one responsible main-operator terminal so as to carry out the equaled distribution of ACD calls, and controls the switching part 11 and the MXT 12 in a manner that an ACD call is received by this main-operator terminal (Step S104). Subsequently, the control part 13 waits that the sub-operator calling button (one of function buttons) of the main-operator terminal receiving the ACD call is pushed (Step S105), and catches the MXT 12 (Step S106) when detecting that the sub-operator calling button is pushed (Step S105; Y). Then, the control part 13 executes the process from the step S107 explained already.

In this way, according to the switching system 10 of the embodiment, when an ACD call is received by the switching part 11, the main-operator can talk with an calling subscriber and the sub-operator can listen to this talk. Therefore, it becomes possible to give training for operators effectively with the switching system.

Modifications

The switching system 10 of the embodiment can be modified in various way. For example, a switching system 10 may be modified so as to be incapable of selecting the calling method and the selecting method. The switching system 10 may be modified in a manner that the registered sub-operator terminal information can be set in the ACD operator group information, for example, by inputting the special code and the sub-operator terminal code into the main-operator terminal. Further, the switching system 10 may be modified in a manner that the main-operator can select a sub-operator capable of listening a call (a talk) by matching some function buttons of the main-operator terminal with sub-operator terminals, respectively The switching system 10 can be also modified in a manner that a sub-operator can join a talk between a main-operator and a calling subscriber (in a manner that a talk can be carry out among the sub-operator, the main-operator and the calling subscriber).

This invention being thus described, it will be obvious that same may be varied in various ways. Such variations are not to be regarded as departure from the spirit and scope of the invention, and all such departure from the spirit and scope of the invention, modifications would be obvious for one skilled in the art intended to be included within the scope of the following claims.

What is claimed is:

1. A switching system comprising:

switching means, connected to plural main-operator terminals and to plural training-target sub-operator terminals, for connecting a terminal in a public network and a main-operator terminal among the plural main-operator terminals and for making a condition in that information transmitted between two connected terminals including the terminal and the main-operator terminal is heard by a training-target sub-operator terminal among the plural training-target sub-operator terminals;

main-operator terminal selection means, when a call of a predetermined type is received by the switching means, for selecting a responsible main-operator terminal among the plural main-operator terminals;

first control means for controlling the switching means in a manner that the main-operator terminal selected by the main-operator terminal selection means receives the call;

sub-operator terminal selection means, when the main operator terminal receives the call with the first control means, for selecting a responsible training-target sub-operator terminal among the plural training-target sub-operator terminals;

second control means for controlling the switching means in order to make a condition in that information transmitted through the call received by the main-operator terminal is heard by the sub-operator terminal selected by the sub-operator terminal selection means;

first information keeping means for keeping calling method information including at least one automatic calling method information showing that the training-target sub-operator terminal is called automatically and manual calling method information showing that the training-target sub-operator terminals called when instructed by the main-operator terminal; and second information keeping means for keeping selecting method information specifying a selecting method for the training-target sub-operator terminal among an equaled distribution selecting method, a priority selecting method and a registered terminal selecting method;

wherein the sub-operator terminal selection means selects the responsible training-target sub-operator terminal based on the calling method information and the selecting method information.

2. A switching system according to claim 1, wherein said sub-operator terminal selection means, when the calling method information is the automatic calling method information, selects the training-target sub-operator terminal to carry out equaled distribution of information transmitted through the call for the plural training-target sub-operator terminals based on the selecting method information showing the equaled distribution selecting method.

3. A switching system according to claim 1, wherein said sub-operator terminal selection means, when the calling method information is the automatic calling method information, selects a training-target sub-operator terminal corresponded to the main-operator terminal receiving the call based on the selecting method information showing the registered terminal selecting method that corresponds the plural main-operator terminals with the plural training-target sub-operator terminals, respectively.

4. A switching system according to claim 3, further comprising:

rewriting means for rewriting said selecting method information showing the registered terminal selecting method kept in said second information keeping means to correspond a main-operator terminal to a training-target sub-operator terminal specified in accordance with information specifying the training-target sub-operator terminal, the information inputted from the main-operator terminal.

5. A switching system according to claim 1, wherein said sub-operator terminal selection means, when the calling method information is the automatic calling method information, selects a training-target sub-operator terminal to which a highest order of priority is given by the selecting method information showing the priority selecting method kept in the second information keeping means, among the responsible training-target sub-operator terminals.

6. A switching system according to claim 1, wherein said sub-operator terminal selection means, when detecting that a training-target sub-operator terminal is specified for the main-operator terminal receiving the call, selects the specified training-target sub-operator terminal, in a mode of the manual calling method information kept in the first information keeping means.

7. A switching system according to claim 1, wherein said sub-operator terminal selection means, when said the first control means detects that a predetermined operation is executed for the main-operator terminal receiving the call, selects a sub-operator terminal of a high order of priority.

8. A switching system according to claim 1, wherein said sub-operator terminal selection means, when said the first control means detects that a predetermined operation is executed for the main-operator terminal receiving the call, selects a training-target sub-operator terminal in accordance with the equaled distribution selecting method information, in a mode of the manual calling method information kept in the first information keeping means.

9. A switching method for a system connected to plural main-operator terminals and to plural training-target sub-operator terminals, said switching method comprising:

a step of connecting a terminal in a public network with a main-operator terminal among the plural main-operator terminals;

a step of making a condition in that information transmitted between two connected terminals including the terminal and the main-operator terminal is heard by a training-target sub-operator terminal among the plural training-target sub-operator terminals;

a step of receiving a call of a predetermined type;

a step of selecting a responsible main-operator terminal among the plural main-operator terminals;

a step of receiving the call with the selected main-operator terminal;

a step of selecting a responsible training-target sub-operator terminal among the plural training-target sub-operator terminals;

a step of making a condition in that information transmitted through the call is heard by the selected training-target sub-operator terminal;

a step of keeping calling method information including at least one automatic calling method information showing that the training-target sub-operator terminal is called automatically and manual calling method information showing that the training-target sub-operator terminal is called when instructed by the main-operator terminal;

a step of keeping selecting method information specifying a selecting method for the training-target sub-operator terminal among an equaled distribution selecting method, a priority selecting method and a registered terminal selecting method; and a step of selecting the responsible training-target sub-operator terminal based on the calling method information and the selecting method information.

10. A computer readable medium storing program steps executed in a system connected to plural main-operator terminals and to plural training-target sub-operator terminals, said program comprising:

a step of connecting a terminal in a public network and a main-operator terminal among the plural main-operator terminals;

a step of making a condition in that information transmitted between two connected terminals including the terminal and the main-operator terminal is heard by a training target sub-operator terminal among the plural training-target sub-operator terminals;

a step of receiving a call of a predetermined type, a step of selecting a responsible main-operator terminal among the plural main-operator terminals;

a step of receiving the call by the selected main-operator terminal;

a step of selecting a responsible training-target sub-operator terminal among the plural training-target sub-operator terminals;

a step of making a condition in that information transmitted through the call is heard by the selected training-target sub-operator terminal;

a step of keeping calling method information including at least one automatic calling method information showing that the training-target sub-operator terminal is called automatically and manual calling method information showing that the training-target sub-operator terminal is called when instructed by the main-operator terminal;

a step of keeping selecting method information specifying a selecting method for the training-target sub-operator terminal among an equaled distribution selecting method, a priority selecting method and a registered terminal selecting method; and a step of selecting the responsible training-target sub-operator terminal based on the calling method information and the selecting method information.

* * * * *